(12) United States Patent
You et al.

(10) Patent No.: US 10,554,395 B2
(45) Date of Patent: *Feb. 4, 2020

(54) SEMICONDUCTOR DEVICE MANAGING POWER BUDGET AND OPERATING METHOD THEREOF

(71) Applicants: SK Hynix Inc., Icheon (KR); Industry-Academic Cooperation Foundation Yonsei University, Seoul (KR)

(72) Inventors: Taehee You, Incheon (KR); Sangwoo Han, Seoul (KR); Youngmin Park, Seoul (KR); Eui-Young Chung, Daejeon (KR); Jaewoo Park, Suwon (KR); Byungryul Kim, Icheon (KR); Younghwan Hong, Icheon (KR)

(73) Assignees: SK Hynix Inc., Icheon (KR); Industry-Academic Cooperation Foundation Yonsei University, Seoul (KR)

(*) Notice: Subject to any disclaimer, the term of this patent is extended or adjusted under 35 U.S.C. 154(b) by 225 days.

This patent is subject to a terminal disclaimer.

(21) Appl. No.: 15/453,259

(22) Filed: Mar. 8, 2017

(65) Prior Publication Data
US 2017/0277244 A1 Sep. 28, 2017

(30) Foreign Application Priority Data

Mar. 24, 2016 (KR) .................. 10-2016-0035066

(51) Int. Cl.
*G06F 21/00* (2013.01)
*H04L 9/08* (2006.01)

(52) U.S. Cl.
CPC .................................. *H04L 9/0838* (2013.01)

(58) Field of Classification Search
CPC ... H04L 9/0838; G06F 1/3206; G06F 1/3228; G06F 1/3243; G06F 1/3287; G06F 21/81; G06F 21/83; G06F 2221/2147; Y02D 10/171; Y02D 10/152
See application file for complete search history.

(56) References Cited

U.S. PATENT DOCUMENTS

| | | | | |
|---|---|---|---|---|
| 5,764,761 A | * | 6/1998 | Vicard | G06F 21/71 713/168 |
| 6,714,553 B1 | * | 3/2004 | Poole | H04L 12/4625 370/412 |
| 7,283,162 B2 | * | 10/2007 | Silverbrook | B41J 2/14427 348/207.2 |
| 8,572,423 B1 | * | 10/2013 | Isachar | G06F 1/3225 365/244 |

(Continued)

FOREIGN PATENT DOCUMENTS

| KR | 10-2012-0123653 A | 11/2012 |
|---|---|---|
| KR | 10-2014-0006344 A | 1/2014 |

*Primary Examiner* — Ghodrat Jamshidi

(57) ABSTRACT

A semiconductor device may comprise a plurality of chips coupled in a ring structure, and the plurality of chips includes a first chip. Each of the plurality of chips may include a key port receiving or outputting a key to circulate the key through the ring structure. The first chip is configured to be in a standby state until an amount of available token becomes equal to or greater than an amount of required token to perform a specific operation in the first chip, when the first chip has the key.

18 Claims, 9 Drawing Sheets

(56) References Cited

U.S. PATENT DOCUMENTS

| | | | | |
|---|---|---|---|---|
| 9,043,590 | B2 | 5/2015 | Isachar et al. | |
| 2007/0168676 | A1* | 7/2007 | Fayad | G06F 21/72 |
| | | | | 713/185 |
| 2011/0032677 | A1* | 2/2011 | Chall | G06F 1/3203 |
| | | | | 361/707 |
| 2011/0095918 | A1* | 4/2011 | Kim | H01H 13/79 |
| | | | | 341/22 |
| 2013/0031375 | A1* | 1/2013 | Lin | G06F 21/44 |
| | | | | 713/192 |
| 2014/0010033 | A1* | 1/2014 | Won | G11C 7/22 |
| | | | | 365/227 |
| 2014/0143558 | A1* | 5/2014 | Kuesel | G06F 1/26 |
| | | | | 713/300 |
| 2014/0289488 | A1* | 9/2014 | Connolly | G06F 21/79 |
| | | | | 711/163 |
| 2015/0277535 | A1* | 10/2015 | Uan-Zo-Li | G06F 1/3234 |
| | | | | 713/320 |
| 2016/0147291 | A1* | 5/2016 | Thomas | G06F 1/3296 |
| | | | | 713/320 |
| 2016/0291658 | A1* | 10/2016 | Kim | G06F 1/26 |
| 2017/0093585 | A1* | 3/2017 | Lee | G06Q 40/02 |

\* cited by examiner

SEMICONDUCTOR DEVICE MANAGING POWER BUDGET AND OPERATING METHOD THEREOF

CROSS-REFERENCE TO RELATED APPLICATION

The present application claims priority to Korean Patent Application No. 10-2016-0035066, filed on Mar. 24, 2016, which is incorporated herein by reference in its entirety.

BACKGROUND

1. Field

Embodiments of the present disclosure relate to a semiconductor device for performing power management and a method of operating the same, and more particularly, to a semiconductor device for performing power management based on one or more tokens and an operation method thereof.

2. Description of the Related Art

During an operation of a semiconductor device, there may occur a period in which a peak instantaneous current flows in the semiconductor device, thereby consuming more power than the average power consumed by the semiconductor device.

A section corresponding to the period is called a peak zone (PKZ) and the operation including this section is called a peak zone operation.

When the semiconductor device includes a plurality of chips and the plurality of chips simultaneously perform respective peak zone operations, a failure may occur in the semiconductor device due to excessive current consumption.

In order to substantially prevent such a failure, a power management technique using token has been used in a conventional semiconductor device. Specifically, such a conventional semiconductor device includes a plurality of chips having a unidirectional ring structure.

A chip in the conventional semiconductor device having the unidirectional ring structure waits until a sufficient amount of token is collected to perform a peak zone operation. As used in this disclosure, the term 'token' indicates authorization to perform a specific operation. For example, when a chip receives token and an amount of the received token is equal to or greater than a threshold value, the chip can perform the specific operation. However, one of skilled in the art will understand that such references are merely for convenience of description and are not intended to limiting. Specifically, the term 'an amount of token' can be used interchangeably with another term 'a number of tokens.' For example, the amount of token equal to 70 can correspond to the number of tokens equal to 70.

As shown above, since the conventional semiconductor device has the unidirectional ring structure, when the conventional semiconductor device further includes a next chip operating subsequent to the chip, the next chip cannot perform a corresponding peak zone operation and is in a standby state until the chip performs the peak zone operation with the sufficient amount of token, even if the next chip has a sufficient amount of token to perform the corresponding peak zone operation. As a result, the operation performance of the conventional semiconductor device is deteriorated.

In addition, a dead-lock phenomenon in which a waiting time is not terminated may occur in the conventional semiconductor device, as will be described below with reference to FIG. 1. FIG. 1A to 1D are diagrams illustrating such a deadlock phenomenon of a conventional semiconductor device 10. Referring FIGS. 1A to 1D, the conventional semiconductor device 10 includes a first chip 11, a second chip 12, a third chip 13, and a fourth chip 14, which are connected in a unidirectional ring structure. The first chip 11, the second chip 12, and the third chip 13 perform first, second, and third operations, respectively, as will be described below.

At a first time, as shown in FIG. 1A, an amount of required token in the first chip 11 to perform the first operation and an amount of required token in the third chip 13 to perform the third operation are 30 and 80, respectively, and each of the second chip 12 and the fourth chip 14 does not require token. An amount of available token is 100 and the whole amount of the available token is provided to the first chip 11.

At a second time, as shown in FIG. 1B, the first chip 11 transfers remaining token having an amount (i.e., 70) to the third chip 13, the remaining token being obtained by subtracting the amount (i.e., 30) of the required token to perform the first operation from the amount (i.e., 100) of the available token in the first chip 11. Thus, an amount of available token in the third chip 13 becomes 70. That is, since a portion of the available token, which has an amount (i.e., 30) equal to the amount of the required token, is allocated to perform the first operation and the remaining token is transferred to the third chip 13, the amount of the allocated token in the first chip 11 becomes 30, and the amount of the available token in the third chip 13 becomes 70 at the second time.

At a third time, as shown in FIG. 1C, the first chip 11 is still performing the first operation, and the second chip 12 requires an amount (i.e., 40) of token to perform the second operation. In addition, the third chip 13 is waiting without performing the third operation since the amount (i.e., 70) of the available token in the third chip 13 is smaller than the amount of the required token to perform the third operation.

At a fourth time, as shown in FIG. 1D, after the first chip 11 has completed the first operation, and the first chip 11 transfers the amount (i.e., 30) of the available token to the second chip 12. However, at the fourth time, because the amount (i.e., 30) of the available token transferred to the second chip 12 and the amount (i.e., 70) of the available token in the third chip 13 are smaller than the amount (i.e., 40) of the required token in the second chip 12 and the amount (i.e., 80) of the required token in the third chip 13, respectively, each of the second chip 12 and the third chip 13 is waiting in a standby state until the amount of the available token becomes equal to or greater than the amount of the required token.

However, since no additional token can be provided to the second chip 12 and the third chip 13, the standby states of the second chip 12 and the third chip 13 may not be terminated, which is called as the "deadlock phenomenon." Therefore, the semiconductor device 10 that includes the second and third chips 12 and 13 stops operating due to the deadlock phenomenon.

As described above, the conventional semiconductor device 10 has a drawback that the operation performance is deteriorated for power management, and the operation of the device 10 is interrupted under certain conditions.

SUMMARY

Various embodiments are directed to a semiconductor device and an operation method thereof capable of improving operation performance and optimizing consumption of a peak current.

In an embodiment, a semiconductor device may comprise a plurality of chips coupled in a ring structure, the plurality of chips including a first chip. Each of the plurality of chips includes a key port receiving or outputting a key to circulate the key through the ring structure in a first sequence of the plurality of chips. The first chip is configured to be in a standby state until an amount of available token in the first chip becomes equal to or greater than an amount of required token to perform a specific operation in the first chip, when the first chip has the key.

In an embodiment, an operating method of a semiconductor device, which comprises a plurality of chips coupled in a ring structure, the plurality of chips including a first chip and a second chip and transferring a key through the ring structure in a first sequence, may include determining, by the first chip, whether a specific operation to be performed in the first chip requires token; determining, by the first chip, whether the first chip has the key; comparing, by the first chip, an amount of available token in the first chip with an amount of the required token to perform the specific operation when it is determined that the specific operation requires the token; and waiting, by the first chip, in a standby state when the first chip has the key and when the amount of the required token is greater than the amount of the available token in the first chip.

In an embodiment, the operating method of a semiconductor device may further comprise outputting, by the first chip, the key to a third chip when the first chip has the key wherein the plurality of chips may further include the third chip next to the first chip in a second sequence of the plurality of chips.

DETAILED DESCRIPTION

Hereafter, various embodiments will be described below in more detail with reference to the accompanying drawings.

Figure 1:
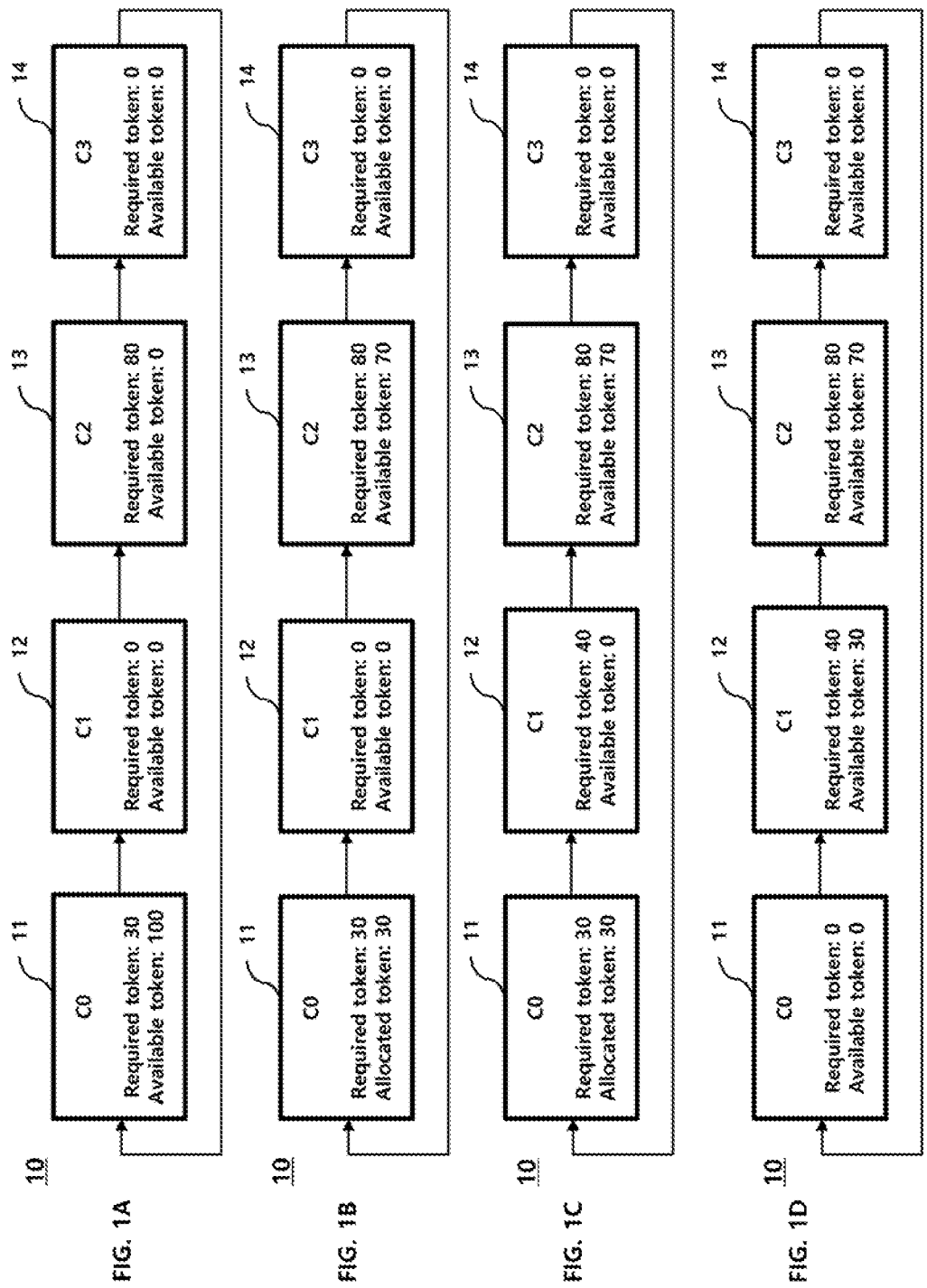
FIGS. 1A, 1B, 1C, and 1D illustrate operations of a conventional power management process.
Figure 2:
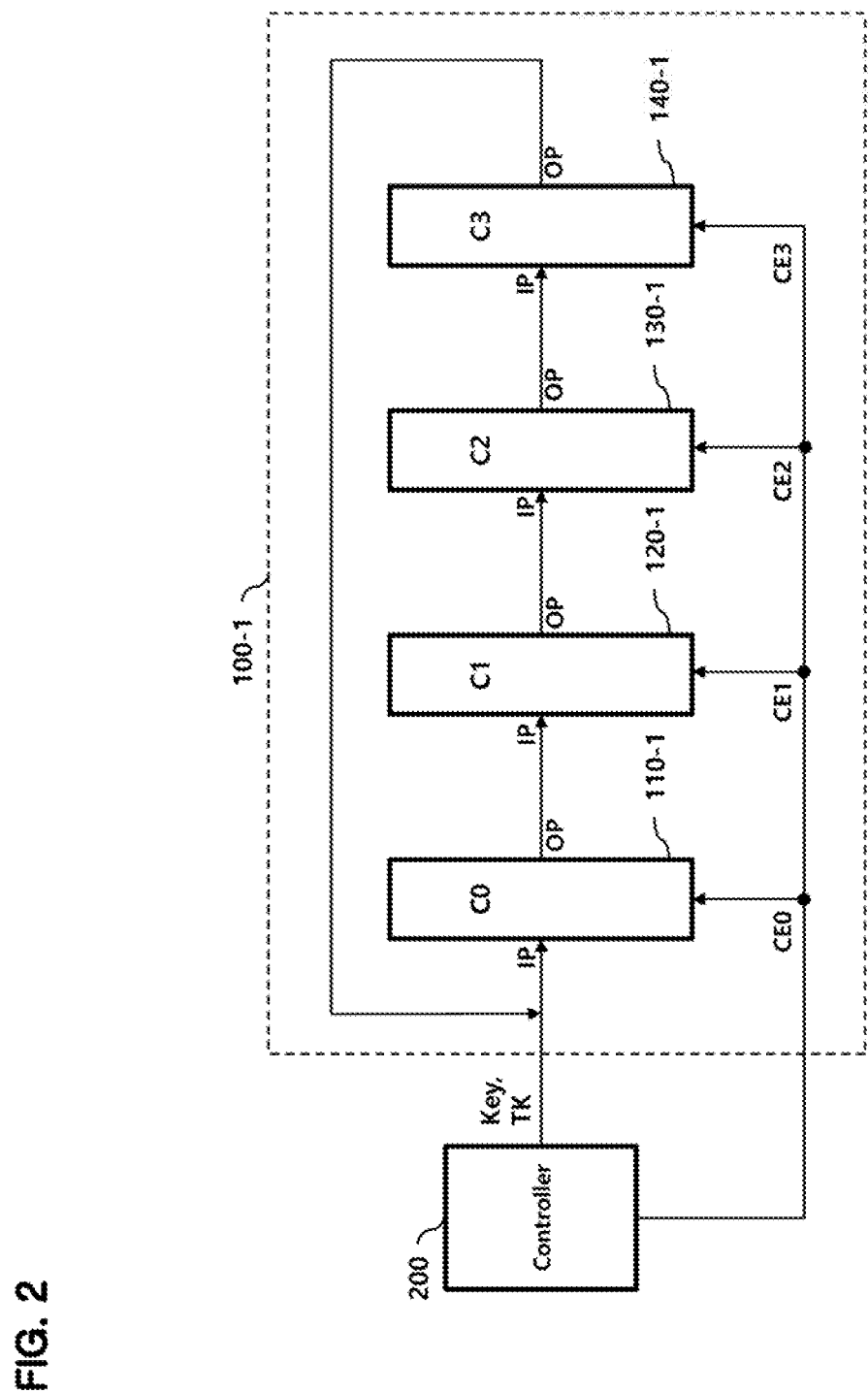
FIG. 2 is a block diagram of a semiconductor device according to an embodiment.
Figure 3:
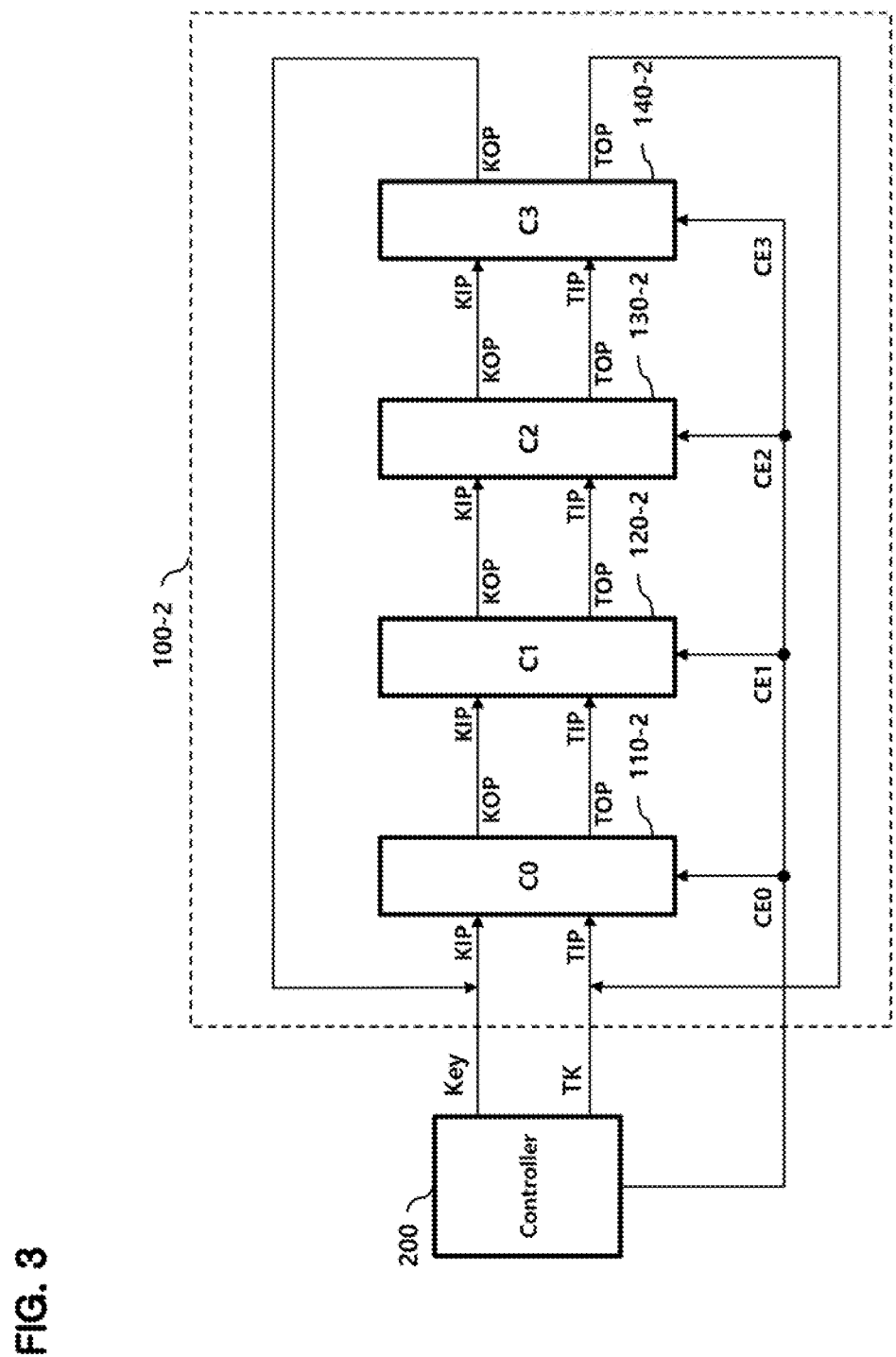
FIG. 3 is a block diagram of a semiconductor device according to an embodiment.
Figure 4:
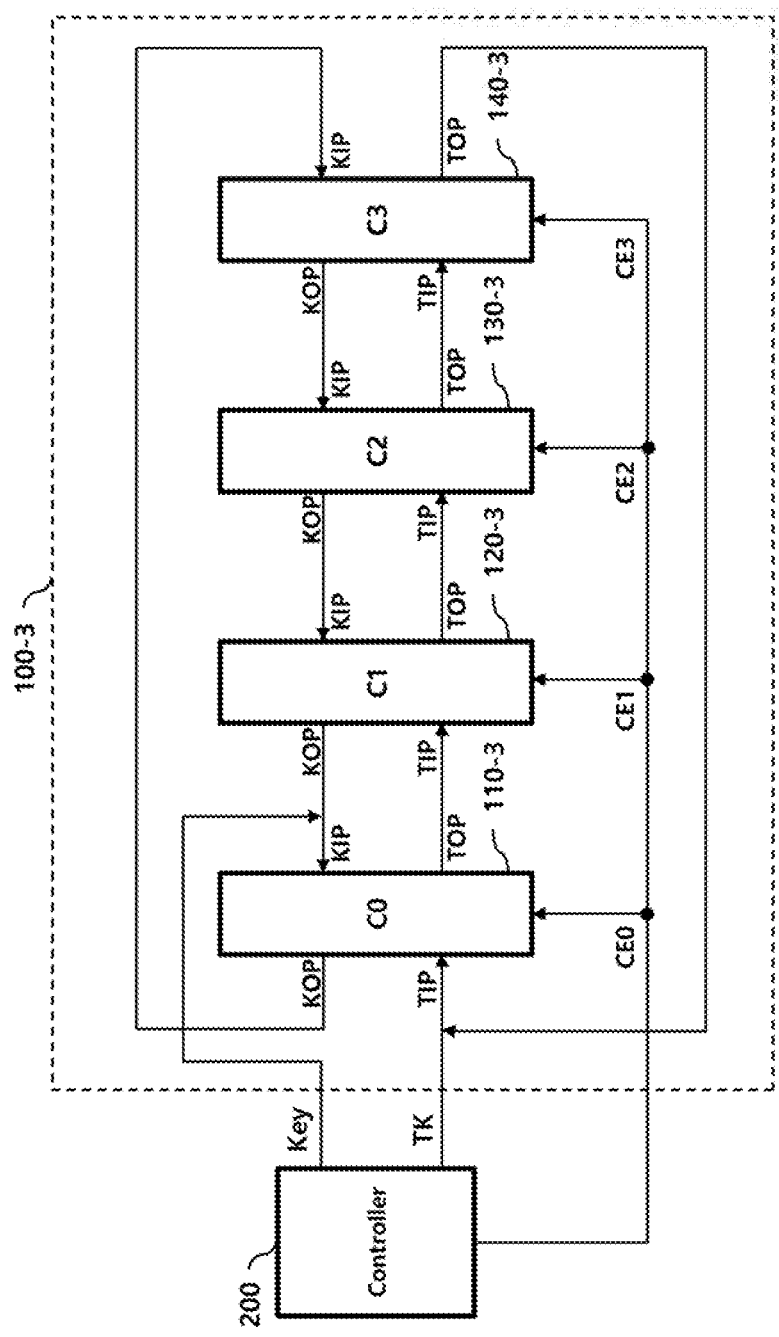
FIG. 4 is a block diagram of a semiconductor device according to an embodiment.

FIGS. 2, 3, and 4 are block diagrams respectively showing semiconductor devices 100-1, 100-2, and 100-3, according to embodiments of the present disclosure.

Each of the semiconductor device 100-1 of FIG. 2, the semiconductor device 100-2 of FIG. 3, and the semiconductor device 100-3 of FIG. 4 includes a plurality of chips, e.g., chips 110-1 to 140-1 of FIG. 2, chips 110-2 to 140-2 of FIG. 3, or chips 110-3 to 140-3 of FIG. 4. Although four chips are shown in each of the embodiments, other embodiments may include a different number of chips.

Referring to FIG. 2, each of the plurality of chips 110-1 to 140-1 receives an input key and input token on an input port IP for power management and outputs an output key and output token through an output port OP. In an embodiment, the input key is the same key as the output key, and thus a single key circulates through the plurality of chips 110-1 to 140-1.

In an embodiment, a controller 200 may input a key Key as the input key and token TK as the input token to the first chip 110-1 at the beginning of a process associated with the power management.

In an embodiment, the controller 200 may provide chip enable signals CE0 to CE3 to the first chip 110-1 to the fourth chip 140-1, respectively.

When each of the plurality of chips 110-1 to 140-1 receives the input key and the input token through the input port IP, the input key and the input token may be provided as one combined data or may be provided as separate data through the input port IP. When each of the plurality of chips 110-1 to 140-1 outputs the output key and the output token through the output port OP, the output key and the output token may be provided as one combined data or may be provided as separate data through the output port OP.

In FIG. 2, each of the chips 110-1 to 140-1 receives the input key and the input token through a single input port IP and outputs the output key and the output token through a single output port OP. However, in the embodiment shown in FIG. 3, each of the chips 110-2 to 140-2 receives an input key through a key input port KIP and input token through a token input port TIP, and outputs an output key through a key output port KOP and output token through a token output port TOP.

In FIG. 2 and FIG. 3, a key and token circulate in the same sequence, e.g., in the order of the first chip 110-1 (or 110-2), the second chip 120-1 (or 120-2), the third chip 130-1 (or 130-2), and the fourth chip 140-1 (or 140-2), and the first chip 110-1 (or 110-2).

In FIG. 4, a key and token may circulate in different sequences, unlike FIG. 3. Specifically, as shown in FIG. 4, the key may circulate in a first sequence, e.g., in the order of the first chip 110-3, the fourth chip 140-3, the third chip 130-3, the second chip 120-3, and the first chip 110-3, while the token may circulate in a second sequence, e.g., in the order of the first chip 110-3, the second chip 120-3, the third chip 130-3, and the fourth chip 140-3, and the first chip 110-3.

Each of the plurality of chips, e.g., the chips 110-3 to 140-3 of FIG. 4, can wait until an amount of available token in the chip becomes equal to or greater than an amount of required token to perform a specific operation in the chip only when the key exists in the chip, thereby avoiding a deadlock phenomenon. In an embodiment, a chip performs a specific operation only when a key exists in the chip and an amount of available token in the chip becomes equal to or greater than an amount of required token for the specific operation. In another embodiment, a chip performs a specific operation when an amount of available token in the chip becomes equal to or greater than an amount of required token for the specific operation, regardless of whether a key exists in the chip.

A process of operating the semiconductor device 100-1 of FIG. 2, the semiconductor device 100-2 of FIG. 3, or the semiconductor device 100-3 of FIG. 4 according to embodiments will be described below with reference to FIGS. 5 to 8.

Figure 5:
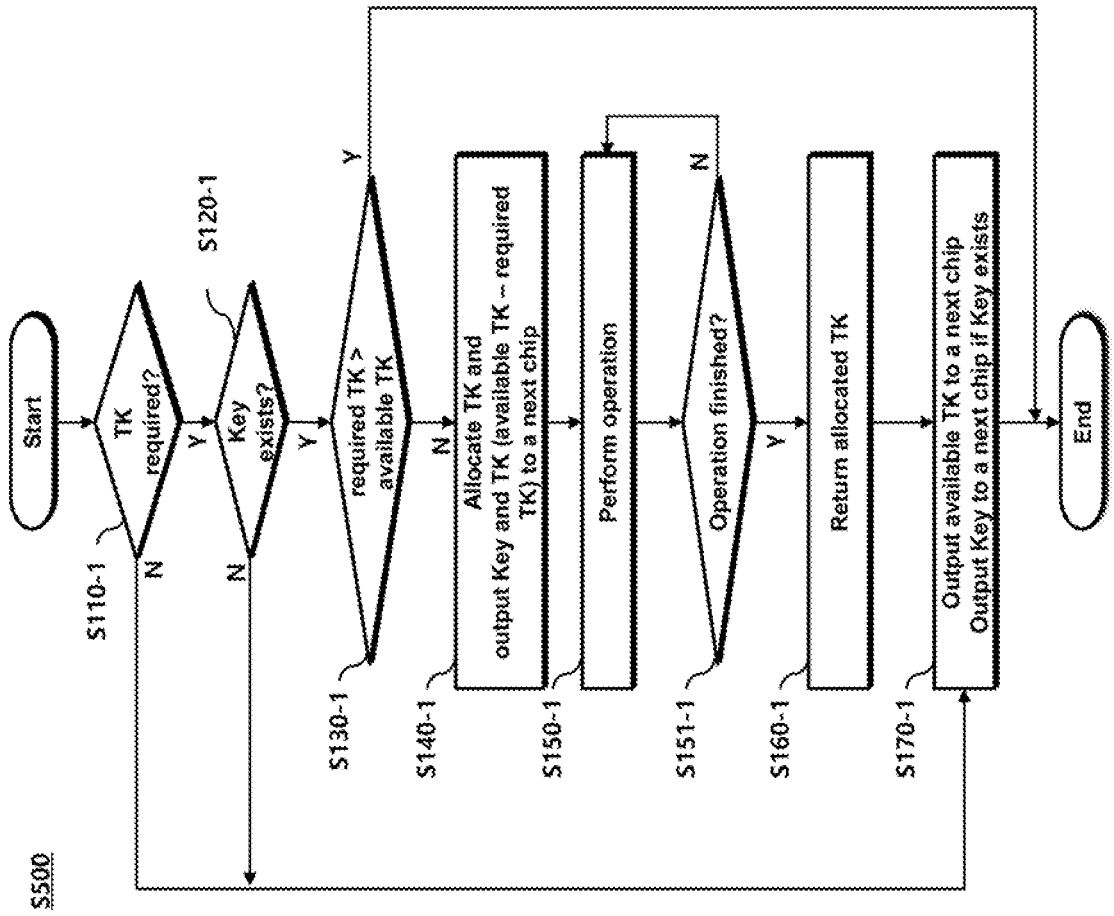
FIG. 5 is a flowchart illustrating operations of a semiconductor device according to an embodiment.

FIG. 5 is a flowchart illustrating a process S500 performed by one of the chips included in the semiconductor device 100-1 of FIG. 2, the semiconductor device 100-2 of FIG. 3, or the semiconductor device 100-3 of FIG. 4, according to an embodiment.

In an embodiment, such a flowchart illustrates a process (e.g., the process S500 of FIG. 5) during a unit cycle in which power control is performed, and the process of the flowchart may be repeated for a number of unit cycles.

At S110-1, it is determined whether a specific operation to be performed by a current chip requires token. For example, a peak zone operation requires token.

If it is determined that the specific operation of the current chip does not require token at S110-1, the current chip outputs available token in the current chip to a next chip operating subsequent to the current chip at S170-1. If the current chip has a key, the key is also output to the next chip.

If it is determined that the specific operation of the current chip requires the token at S110-1, it is determined whether the current chip has a key at S120-1. If the current chip does not have the key, the process S500 proceeds to S170-1.

If the key exists in the current chip, it is determined whether an amount of required token to perform the specific operation is greater than an amount of the available token in the current chip at S130-1.

If the amount of the required token is greater than the amount of the available token in the current chip, the current chip does not perform the specific operation. Therefore, the current chip waits until the amount of the available token becomes sufficiently large to perform the specific operation only when the key exists in the current chip.

If it is determined that the amount of the required token in the current chip is not greater than the amount of the available token at S130-1, a portion of the available token that has the same amount as the required token is allocated to perform the specific operation, the remaining portion of the available token is allocated to remaining token, and the current chip outputs the remaining token and the key to the next chip, at S140-1.

Thereafter, the specific operation is performed in the current chip at S150-1. At S151-1, it is determined whether the specific operation is complete. When it is determined that the specific operation has not been completed, the specific operation is performed again at S150-1.

When it is determined that the specific operation has been completed at S151-1, the portion of the available token that has been allocated to perform the specific operation is returned at S160-1. For example, at S160-1, the current chip sets the portion of the available token allocated to perform the specific operation as new available token in the current chip. Subsequently, the current chip outputs the new available token to the next chip and outputs a key to a next chip if a key exists in the current chip at S170-1.

Figure 6:
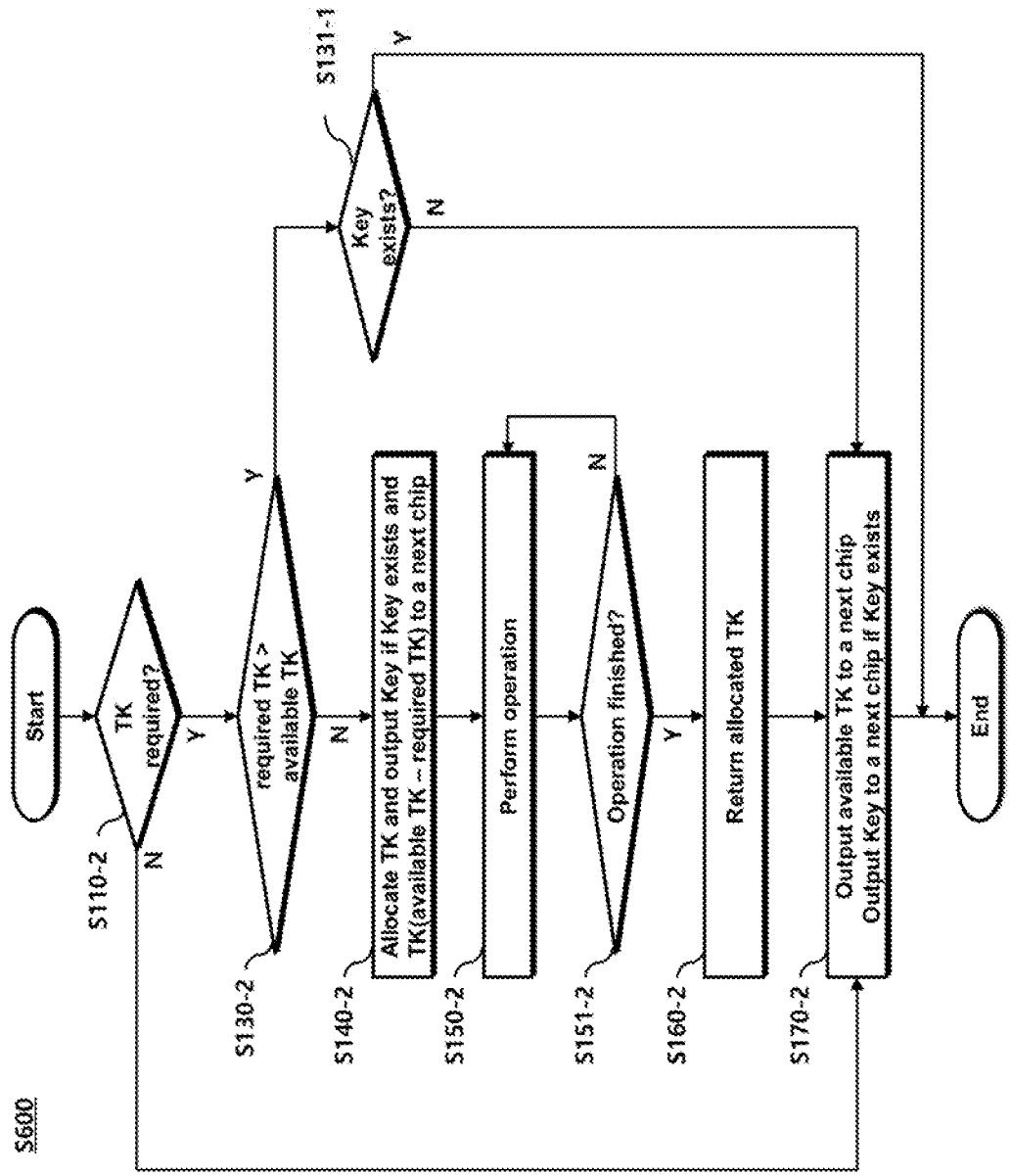
FIG. 6 is a flowchart illustrating operations of a semiconductor device according to an embodiment.

FIG. 6 is a flowchart illustrating a process S600 of a current chip included in the semiconductor device 100-1 of FIG. 2, the semiconductor device 100-2 of FIG. 3, or the semiconductor device 100-3 of FIG. 4, according to an embodiment. The process S600 shown in FIG. 6 differs from the process S500 shown in FIG. 5 in that determining whether a key exists or not in the current chip is performed after, not before, determining whether an amount of required token to perform a specific operation is greater than an amount of available token in the current chip.

In the process S500 of FIG. 5, if it is determined that the key does not exist in the current chip at S120-1, the specific operation is not performed, even if the amount of the available token is equal to or greater than the amount of the required token to perform the specific operation.

On the other hand, in the process S600 of FIG. 6, after it is determined that the amount of the required token is greater than the amount of the available token at S130-2, it is determined that whether the key exists in the current chip at S131-1. Therefore, when it is determined that the amount of the required token is not greater than the amount of the available token at S130-2, the process S600 proceeds to S140-2 and S150-2 to perform the specific operation.

That is, when the amount of the available token is equal to or greater than the amount of the required token to perform the specific operation, the specific operation is performed at S150-2 irrespective of whether the key exists or not in the current chip.

If it is determined at S131-1 that the key does not exist in the current chip, the process S600 proceeds to S170-2 and the current chip outputs the available token to a next chip and the current chip also outputs the key to the next chip if the key exists. If it is determined that the key exists at S131-1, the current chip waits until the amount of the available token becomes sufficiently large to perform the specific operation.

If it is determined that the amount of the required token in the current chip is not greater than the amount of the available token at S130-2, at S140-2, a portion of the available token that has the same amount as the required token is allocated to perform the specific operation, the remaining portion of the available token is allocated to remaining token, the current chip outputs the remaining token to the next chip, and the current chip also outputs the key to the next chip if the key exists.

The other operations of the process S600 of FIG. 6 are similar to those of the process S500 of FIG. 5, and thus descriptions thereof are omitted for the interest of brevity.

Figure 7:
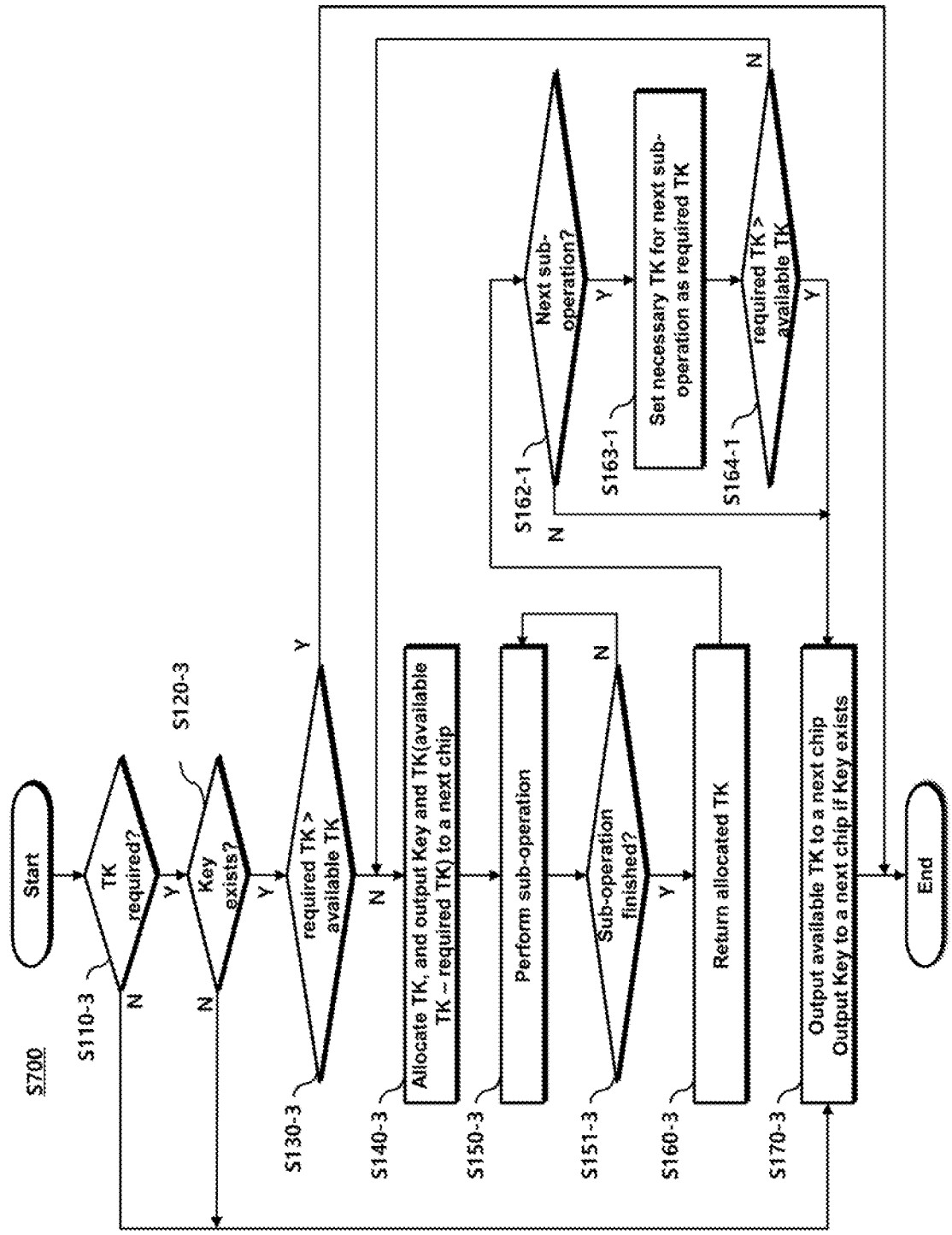
FIG. 7 is a flowchart illustrating operations of a semiconductor device according to an embodiment.

FIG. 7 is a flowchart illustrating a process S700 of a chip included in the semiconductor device 100-1 of FIG. 2, the semiconductor device 100-2 of FIG. 3, or the semiconductor device 100-3 of FIG. 4 according to an embodiment. The process S700 shown in FIG. 7 differs from the process S500 of FIG. 5 in that token is controlled by the sub-operation unit when a specific operation requiring token includes a plurality of sub-operations.

At S110-3, it is determined whether the specific operation to be performed by a current chip requires token. For example, a peak zone operation requires token.

If it is determined that the specific operation of the current chip does not require token at S110-3, the current chip outputs available token in the current chip to a next chip operating subsequent to the current chip at S170-3. If the current chip has a key, the key is also output to the next chip.

If the specific operation of the current chip requires the token, it is determined whether a key exists in the current chip at S120-3. If the current chip does not have the key, the process S700 proceeds to S170-3.

If the key exists in the current chip, it is determined whether an amount of the required token to perform the specific operation is greater than an amount of the available token in the current chip at S130-3.

If the amount of the required token is greater than the amount of the available token in the current chip, the current chip does not perform the specific operation. Therefore, the current chip waits until the amount of the available token becomes sufficiently large to perform the specific operation only when the key exists in the current chip.

If it is determined that the amount of the required token in the current chip is not greater than the amount of the available token at S130-3, a portion of the available token having the same amount as the required token is allocated to perform the specific operation, the remaining portion of the available token is allocated to remaining token, and the current chip outputs the remaining token and the key are output to the next chip at S140-3.

Then, a sub-operation (e.g., a first sub-operation) of the specific operation is performed in the current chip at S150-3. At S151-3, it is determined whether the sub-operation is complete. When it is determined that the sub-operation has not been completed, the sub-operation is performed again at S150-3.

When it is determined that the sub-operation has been completed, the portion of the available token that has been allocated to perform the sub-operation is returned at S160-3. For example, at S160-3, the current chip sets the portion of the available token allocated to perform the sub-operation as second available token.

Then, it is determined whether a next sub-operation (e.g., a second sub-operation) to be performed in the current chip exists at S162-1.

If it is determined that the next sub-operation does not exist at S162-1, the process S700 proceeds to S170-3 and outputs the second available token to the next chip.

If it is determined that the next sub-operation exists at S162-1, required token (or second required token) to perform the next sub-operation is set to have an amount sufficiently large to perform the next sub-operation at S163-1.

Thereafter, it is determined whether the amount of the second required token is greater than an amount of the second available token in the current chip at S164-1.

If the amount of the second required token is greater than the amount of the second available token, the process S700 proceeds to S170-3 and the current chip outputs the second available token to the next chip, and the process S700 ends.

If the amount of the second required token is not greater than the amount of the second available token, the process S700 moves to S140-3 and repeats the above-described steps.

Figure 8:
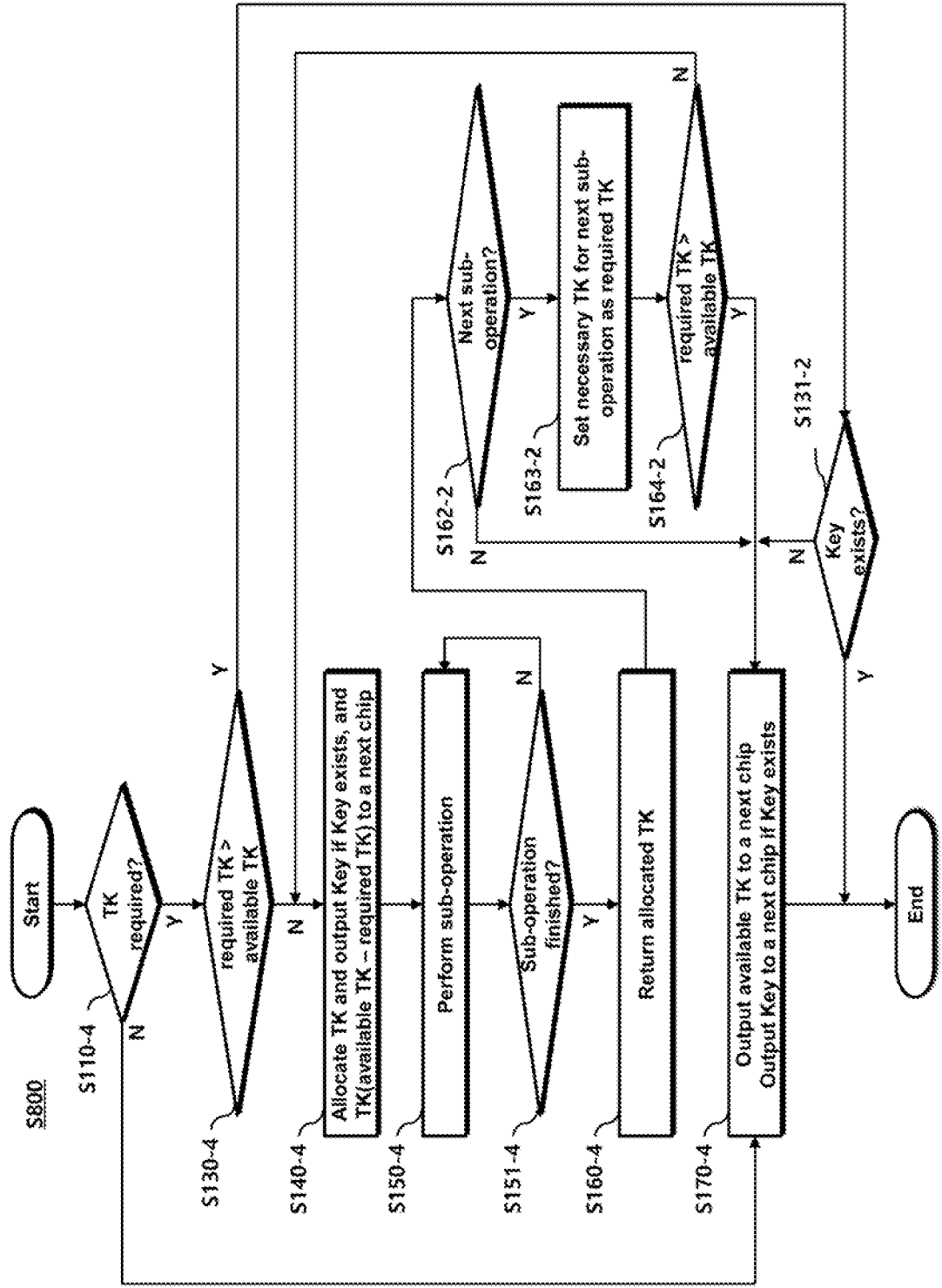
FIG. 8 is a flowchart illustrating operations of a semiconductor device according to an embodiment.

FIG. 8 is a flowchart illustrating a process S800 of a current chip included in the semiconductor device 100-1 of FIG. 2, the semiconductor device 100-2 of FIG. 3, or the semiconductor device 100-3 of FIG. 4 according to an embodiment. The process S800 shown in FIG. 8 differs from the process S700 of FIG. 7 in that determining whether a key exists or not in the current chip is performed after, not before, determining whether an amount of required token to perform a specific operation is greater than an amount of available token in the current chip.

In the process S700 of FIG. 7, if it is determined that the key does not exist in the current chip at S120-3, the specific operation (e.g., the first sub-operation) is not performed, even if the amount of the available token is equal to or greater than the amount of the required token to perform the specific operation.

On the other hand, in the process S800 of FIG. 8, when it is determined that the amount of the required token is greater than the amount of the available token at S130-4, it is determined whether the key exists in the current chip at S131-2. When it is determined that the amount of the required token is not greater than the amount of the available token at S130-4, the process S800 proceeds to S140-4 and S150-4 to perform a sub-operation (e.g., a first sub-operation) included in the specific operation.

Accordingly, if the amount of the available token is equal to or greater than the amount of the required token to perform the sub-operation, the sub-operation is performed irrespective of whether the key exists or not in the current chip.

If it is determined that the key does not exist in the current chip at S131-2, the process S800 proceeds to S170-4, and the current chip outputs the available token to the next chip. If it is determined that the key exists at S131-2, the current chip waits until the amount of the available token becomes sufficiently large to perform the sub-operation.

If it is determined that the amount of the required token in the current chip is not greater than the amount of the available token at S130-4, at S140-4, a portion of the available token that has the same amount as the required token is allocated to perform the sub-operation, the remaining portion of the available token is allocated to remaining token, the current chip outputs the remaining token to the next chip, and the current chip also outputs the key to the next chip if the key exists.

The other operations of the process S800 of FIG. 8 are similar to those of the process S700 of FIG. 7, and therefore, descriptions thereof are omitted for the interest of brevity.

FIGS. 9A to 9D are diagrams illustrating operations of a semiconductor device 100 according to an embodiment of the present disclosure. Referring to FIGS. 9A to 9D, the semiconductor device 100 includes a first chip 110, a second chip 120, a third chip 130, and a fourth chip 140. The first chip 110, the second chip 120, and the third chip 130 perform first, second, and third operations, respectively, as will be described below.

Figure 9A:
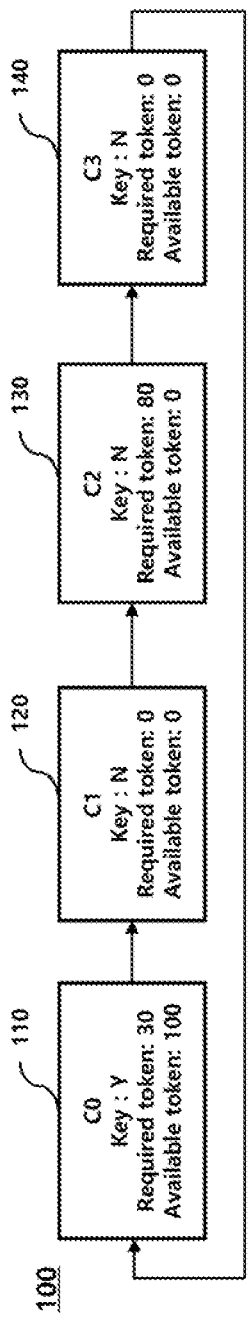
FIGS. 9A, 9B, 9C, and 9D illustrate operations of a semiconductor device according to an embodiment.

At a first time, as shown in FIG. 9A, an amount of required token in the first chip 110 to perform the first operation and an amount of required token in the third chip 130 to perform the third operation are 30 and 80, respectively, and each of the second chip 120 and the fourth chip 140 does not require token. An amount of available token is 100 and the entire amount of the available token is provided to the first chip 110. Also, a key exists in the first chip 110 and each of the remaining chips 120, 130, and 140 does not have the key.

Figure 9B:
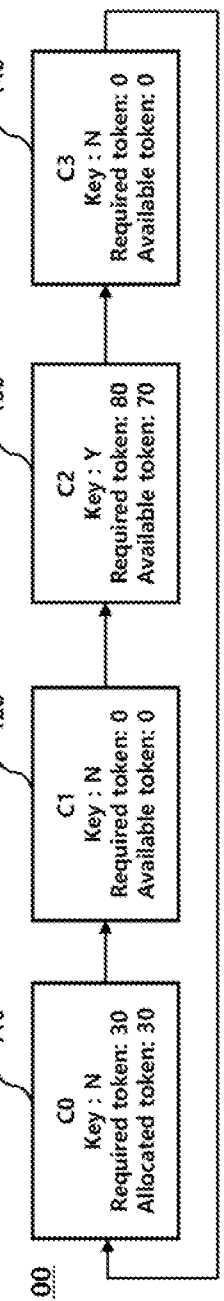

At a second time, as shown in FIG. 9B, the first chip 110 transfers remaining token having an amount (e.g., 70), which is obtained by subtracting the amount (e.g., 30) of the required token to perform the first operation from the amount (e.g., 100) of the available token in the first chip 110, to the third chip 130 through the second chip 120, except the amount of the required token 30. The first chip 110 also transfers the key to the third chip 130 through the second chip 120. A portion of the available token, which has an amount (e.g., 30) equal to the amount of the required token, is allocated to perform the first operation. Accordingly, the amount of the available token in the first chip 110 becomes 0, and an amount of available token in the third chip 130 becomes 70 at the second time.

Figure 9C:
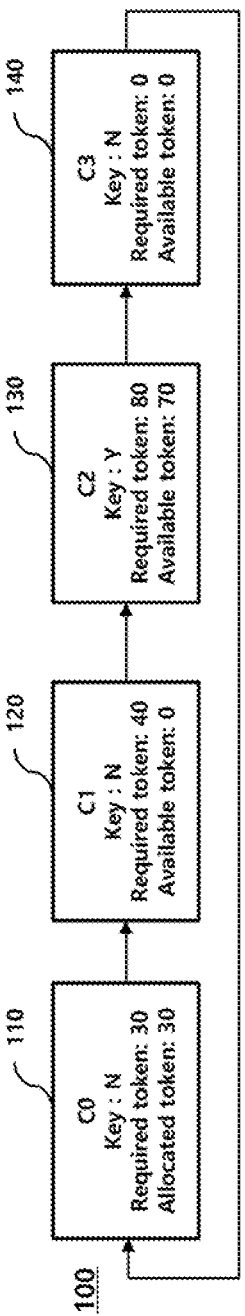

At a third time, as shown in FIG. 9C, the first chip 110 is still performing the first operation, and the second chip 120 requires an amount (e.g., 40) of required token to perform the second operation. In addition, the third chip 130 has the key and the amount (e.g., 70) of the available token in the third chip 130 is smaller than the amount (e.g., 80) of the required token in the third chip 130 to perform the third operation, and thus the third chip 130 is still waiting in a standby state.

Figure 9D:
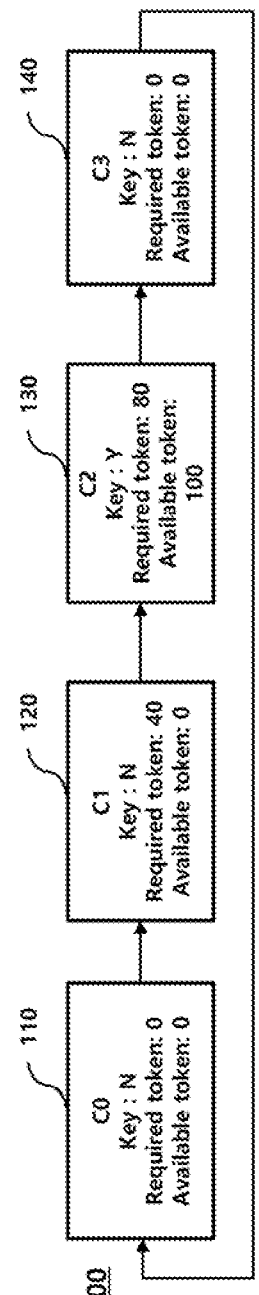

At a fourth time, as shown in FIG. 9D, after the first chip 110 has completed the first operation, the first chip 110 sets an amount of new available token in the first chip 110 as the amount (e.g., 30) of the required token, and then the first chip 110 transfers the new available token having the set amount (e.g., 30) to the second chip 120. Since the second chip 120 does not have the key and the transferred available token is smaller than the amount (e.g., 40) of the required token to perform the second operation, the second chip 120 outputs the transferred available token to the third chip 130, which is next to the second chip 120. Thus, the available token in the third chip 130 has the amount (e.g., 100) sufficiently large to perform the third operation, and the third chip 130 performs the third operation.

Accordingly, in a semiconductor device according to an embodiment of the present disclosure, a deadlock phenomenon does not occur and the performance of such a semiconductor device can be improved.

Although various embodiments have been described for illustrative purposes, it will be apparent to those skilled in the art that various changes and modifications may be made without departing from the spirit and scope of the invention as defined in the following claims.

What is claimed is:

1. A semiconductor device comprising:
   a plurality of chips coupled in a ring structure, the plurality of chips including a first chip and a second chip next to the first chip in a first sequence,
   wherein each of the plurality of chips includes a key port receiving or outputting a key to circulate the key through the ring structure in the first sequence of the plurality of chips, and
   wherein the first chip is configured to be in a standby state until an amount of available token in the first chip becomes equal to or greater than an amount of required token to perform a specific operation in the first chip, when the first chip has the key,
   wherein the first chip is further configured to output the available token whose amount is less than the amount of the required token to the second chip, when the first chip does not have the key, and
   wherein the first chip is further configured to output the available token to the second chip when the amount of the required token to perform the specific operation is greater than the amount of the available token and when the first chip does not have the key.

2. The semiconductor device of claim 1, wherein the key port includes a key input port configured to receive the key and a key output port configured to output the key, and
   wherein each of the plurality of chips further includes a token input port configured to receive token and a token output port configured to output token.

3. The semiconductor device of claim 2, wherein the ring structure comprises a first ring structure in which the key circulates in the first sequence of the plurality of chips through the key input ports and the key output ports of the plurality of chips, and
   wherein the ring structure further comprises a second ring structure in which token circulates in the first sequence of the plurality of chips through the token input ports and the token output ports of the plurality of chips.

4. The semiconductor device of claim 2, wherein the ring structure comprises a first ring structure in which the key circulates in the first sequence of the plurality of chips through the key input ports and the key output ports of the plurality of chips, and
   wherein the ring structure further comprises a second ring structure in which token circulates in a second sequence of the plurality of chips through the token input ports and the token output ports of the plurality of chips, the first sequence being different from the second sequence.

5. The semiconductor device of claim 1, wherein the first chip performs the specific operation when the amount of the available token is equal to or greater than the amount of the required token.

6. The semiconductor device of claim 5,
   wherein the first chip outputs remaining token and the key to the second chip before performing the specific operation in the first chip, the remaining token having an amount obtained by subtracting the amount of the required token from the amount of the available token.

7. The semiconductor device of claim 1, wherein the specific operation comprises a plurality of sub-operations, the plurality of sub-operations including a first sub-operation, the amount of the required token to perform the specific operation being equal to an amount of required token to perform the first sub-operation, and
   wherein the first chip performs the first sub-operation when the amount of the available token is equal to or greater than the amount of the required token to perform the first sub-operation.

8. The semiconductor device of claim 7, wherein the plurality of sub-operations further include a second sub-operation, the required token to perform the first sub-operation being first required token, the available token in the first chip before performing the first sub-operation being first available token, and
   wherein the first chip performs the second sub-operation when an amount of second available token in the first chip after performing the first sub-operation is equal to or greater than an amount of second required token to perform the second sub-operation, the second available token corresponding to the first required token.

9. The semiconductor device of claim 7,
   wherein the first chip outputs remaining token and the key to the second chip before performing the first sub-operation, the remaining token having an amount obtained by subtracting the amount of the required token from the amount of the available token.

10. An operating method of a semiconductor device, the semiconductor device comprising a plurality of chips coupled in a ring structure, the plurality of chips including a first chip and a second chip and transferring a key through the ring structure in a first sequence, the second chip being next to the first chip in the first sequence of the plurality of the chips, the operating method comprising:
    determining, by the first chip, whether a specific operation to be performed in the first chip requires token;
    determining, by the first chip, whether the first chip has the key;
    comparing, by the first chip, an amount of available token in the first chip with an amount of the required token to perform the specific operation when it is determined that the specific operation requires the token;
    waiting, by the first chip, in a standby state when the first chip has the key and when the amount of the required token is greater than the amount of the available token in the first chip; and
    outputting, by the first chip, the available token to the second chip when the first chip does not have the key,
    wherein the method further comprises
    outputting, by the first chip, the available token to the second chip when the amount of the required token to perform the specific operation is greater than the amount of the available token and when the first chip does not have the key.

11. The operating method of claim 10, further comprising:
performing, by the first chip the specific operation when the amount of the available token is equal to or greater than the amount of the required token.

12. The operating method of claim 11, further comprising:
outputting, by the first chip, remaining token to the second chip before performing the specific operation, the remaining token having an amount obtained by subtracting the amount of the required token from the amount of the available token.

13. The operating method of claim 12, further comprising:
outputting, by the first chip, the key to the second chip when the first chip has the key.

14. The operating method of claim 11, wherein the specific operation comprises a first sub-operation and a second sub-operation, the amount of the required token to perform the specific operation being equal to an amount of token required to perform the first sub-operation, and
wherein performing the specific operation comprises:
performing the first sub-operation, the available token in the first chip before performing the first sub-operation being first available token, the required token to perform the first sub-operation being first required token;
setting an amount of second available token after performing the first sub-operation in the first chip to be equal to an amount of the first required token;
comparing the amount of the second available token with an amount of second required token to perform the second sub-operation in the first chip; and
performing the second sub-operation when the amount of the second available token is equal to or greater than the amount of the second required token to perform the second sub-operation.

15. The operating method of claim 14, further comprising:
outputting, by the first chip, the amount of the second available token in the first chip to the second chip when the amount of the second available token is less than the amount of the second required token to perform the second sub-operation.

16. The operating method of claim 11, further comprising:
outputting, by the first chip, the available token to the second chip after performing the specific operation.

17. The operating method of claim 10, further comprising:
outputting, by the first chip, the available token to the second chip when the first chip does not perform the specific operation.

18. The operating method of claim 17, further comprising:
outputting, by the first chip, the key to the second chip when the first chip has the key.

* * * * *